Figure 1:
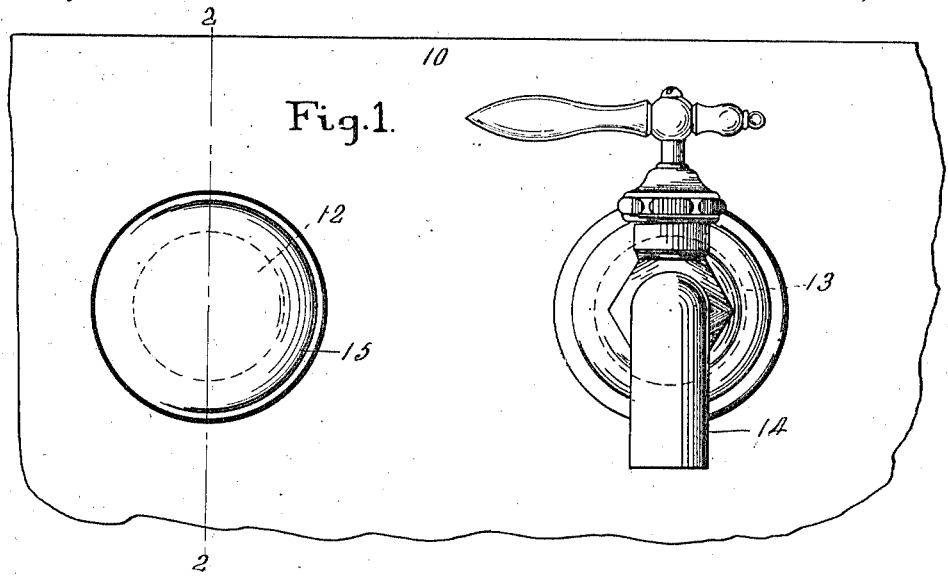

P. & H. MUELLER.
O. B. & A. MUELLER, EXECUTORS OF H. MUELLER, DEC'D.
COCK HOLE COVER.
APPLICATION FILED JULY 19, 1910.

1,040,735.

Patented Oct. 8, 1912.

WITNESSES:
Henry Plate

INVENTORS
Henry Mueller.
Philip Mueller.
BY Meyers, Cushman & Rea
ATTORNEYS

UNITED STATES PATENT OFFICE.

PHILIP MUELLER AND HENRY MUELLER, OF DECATUR, ILLINOIS; ORA B. MUELLER AND ADOLPH MUELLER, EXECUTORS OF SAID HENRY MUELLER, DECEASED, ASSIGNORS TO H. MUELLER MANUFACTURING COMPANY, OF DECATUR, ILLINOIS, A CORPORATION OF ILLINOIS.

COCK-HOLE COVER.

1,040,735. Specification of Letters Patent. Patented Oct. 8, 1912.

Application filed July 19, 1910. Serial No. 572,779.

*To all whom it may concern:*

Be it known that we, PHILIP MUELLER and HENRY MUELLER, citizens of the United States, residing at Decatur, in the county of Macon and State of Illinois, have invented new and useful Improvements in Cock-Hole Covers, of which the following is a specification.

Our invention relates to covers for cock holes in plumbing fixtures such as baths, sinks, lavatories, etc. As ordinarily manufactured these fixtures are made with two or more holes formed in the body for the attachment of cocks to control the flow of water from the supply pipes to the fixture. Ordinarily these cocks are provided with tail pieces which project through the body of the fixture and are attached to the supply pipe by a sleeve or a union. It frequently happens that it is not desired to use more than one supply pipe as for instance where it is desired to use only cold water, the hot water connection being dispensed with, and in such case only one cock is of use and the others are plugged up. It is the present practice to plug these holes up by covering them with a plate or other device of ornamental design, use being made of this device to support a ring to which the stopper used in connection with the fixture is attached. These cover plates are provided on their rear sides with screw-threaded bolts which pass through the cock holes and coöperate with a nut and washer to secure the plate in place, the washer being separate from the nut and of large size in order to extend beyond the hole and find a bearing surface on the wall of the fixture. This construction of a cover plate and the method of attaching it are open to the objection that it is hard to properly secure them in position, the parts many times working loose and dropping down, thus exposing a part of the hole to view. In some instances the nut works entirely off of the bolt and the plate falls out and is lost. A careless plumber often leaves the cover plate in a position in which it exposes a part of the cock hole or else does not accurately place it, thus giving the fixture an unattractive appearance. The cover plates are also many times at fault, being so constructed that dirt collects around their edges and besides being uncleanly is unsanitary. The cover plate is also sometimes made very thin and of such shape that it buckles or kinks due to careless handling or accidental striking of it through shipment or while it is being installed, or even after being installed, and this likewise detracts from its good appearance.

It is the object of our invention to design a cover plate which will overcome these difficulties and annoyances, and the details of our invention, the manner in which they coöperate to produce the result desired, and their full advantages will be readily apparent from the following specification taken in connection with the accompanying drawing, in which is illustrated the preferred embodiment of the invention and in which—

Figure 2:
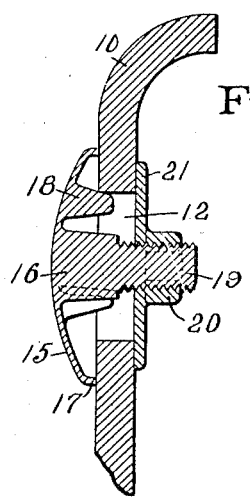
Figure 6:
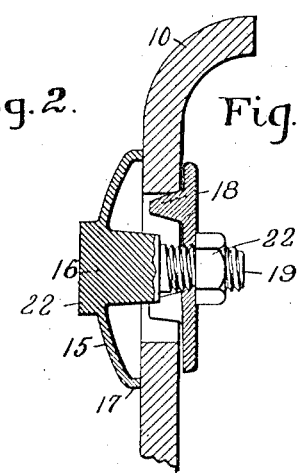
Figure 4:
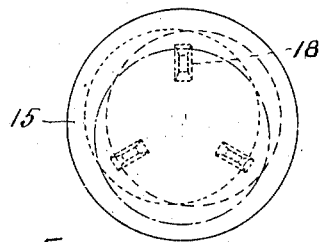
Figure 5:
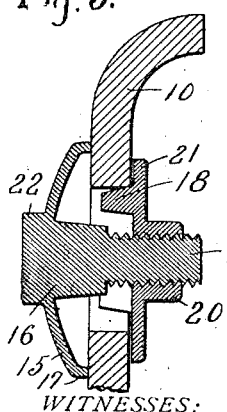
Figure 3:
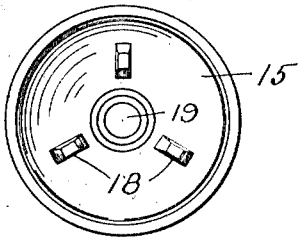

Figure 1 is a front elevation of the vertical wall of a lavatory provided with two cock holes, one of which is in use and the other of which is covered by one of our improved cover plates; Fig. 2 is a central section through the attached cover plate of Fig. 1; Fig. 3 is a rear elevation of our improved cover plate; Fig. 4 is a diagrammatical view showing the adaptability of our cover plate, and Fig. 5 is a view of a modified construction. Fig. 6 is a still further modification.

Referring to the drawings, 10 is the wall plate of the lavatory. Similar to it is the side wall of an ordinary bath tub or other side wall of a sink. There are two cock holes 12 and 13 in this wall, one of which 13 is equipped with a controlling cock 14 while the other 12 is covered from the side by the cover plate 15. Reference to Fig. 2 will show that it is dome-shaped in general construction consisting of a spherical main body portion 16 and a flange portion 17 around the edge thereof and at an angle thereto. On its rear side are a plurality of lugs 18 the active faces of which are tapered, and preferably, as shown are spaced away from the axis of the cover plate. It will be noted that the lugs or projections shown not only taper from the body of the cover plate to their ends but their outermost sides taper inwardly or toward the axis of the cover plate. Extending centrally and axially from the rear side of the cover plate is a bolt or screw 19 screw-threaded at its outer end. Threaded on this bolt is what we term a washer nut, which consists of a nut 20 having an integrally formed flange 21 of substantially the same diameter as the cover plate 15. As shown, the cover plate is secured to the wall of the fixture by passing the bolt 19 through the cock hole to be covered from the front and screwing up the nut on the bolt at the rear until the flange 21 bears on the wall and clamps the plate in place.

From the construction described several very important advantages result, and the troubles above outlined are obviated. By making the cover plate in the dome-shape form with the flange edge portion 17, we greatly increase its strength so that when it is firmly clamped in place by the screwing up of the nut 20 there is no buckling and the cover plate retains its attractive shape. By virtue of its shape there is also less likelihood of accidental damage during shipment and after instalment. Preferably we form the inner edge of the flange 17 flat as shown, the entire edge being flat and in the same plane so that it makes a tight joint with the wall of the fixture when clamped down. Dirt is thus effectually prevented from entering behind the cover plate and from accumulating beneath the edge of it. By forming the plate with spaced projections on its rear side we enable it to be accurately positioned with respect to the hole, the projections entering the hole and bearing against the side walls of the same. By making the projections inwardly tapering a cover plate may be readily and easily fitted and centered with respect to the opening 12 and may be used with many sizes of holes. Preferably the cover plate is made of soft brass or other bendable material having its exterior surface covered with nickel. When the projections are spaced away from the axis of the plate as shown and are entered in the small hole and the cover plate is drawn down tightly the projections give toward the axis of the cover plate until the cover plate is clamped fully down. In case the cover plate is used with a large hole there is considerable play between the projections 18 and the walls of the cock hole but within the range of holes provided in standard fixtures the projections are so formed that they position the cover plate accurately enough for all practical purposes. An example of this range of adaptability is shown in Fig. 4 where the dotted circles represent cock holes, and the single full line circle with the dotted projections represents a cover plate. With the cover plate as shown it accurately covers any one of the three cock holes shown in outline, and the inaccuracy is insufficient to detract from the appearance of the fixture. By providing a washer nut instead of the ordinary form of nut and washer a more efficient securing means is had. Not only are the nut and washer always together and less likely to be lost, but the flange or washer portion 21 has an extended bearing surface on the rear side of the fixture wall, thus having a firm frictional engagement when the nut is screwed fully home. The nut is therefore less likely to come off. During the turning up of the nut the projections 18 act to prevent the cover plate from turning by virtue of their engagement with the inner walls of the cock hole, thus avoiding trouble which sometimes arises from this source. That all these detail advantages combine to produce a most efficient cover plate and attachment is evident.

In Fig. 5 is shown a modification of our improved cover plate. This modification differs from the principal embodiment in the location of the projections 18, they being attached to the washer nut 20 instead of to the cover plate. Obviously, the same result is obtained by their use, excepting for the fact that they do not aid in preventing the cover plate from turning, but themselves have to be turned with the nut. In such instance we might provide a nut to accommodate a wrench on the cover plate, as shown at 22.

In the modification of Fig. 6 the washer is made separate from the nut and the projections are spaced farther apart to come into positive engagement with the walls of the opening.

While we have described the best form of our invention now known to us, it is obvious that many changes may be made in its specific embodiment especially as to form and proportionment without departing in any wise from its generic spirit. These modifications as well as the use of our device in connection with all fixtures with which it may be used we desire to cover in the annexed claims.

What we claim is,—

1. A closure for openings in lavatory walls, comprising a cover member having an outer edge cupped and adapted to fit against one face of a lavatory wall, said cover member being provided with a centrally disposed externally threaded shank integral with it and of sufficient length to extend through an opening in said wall, and a clamping member provided with a centrally disposed threaded opening into which said threaded shank fits in order to force said cover member and said clamping member toward each other, one of said members having inwardly extending legs integral with it and projecting into said opening, said legs having outer inclined faces for binding against the marginal edge of the opening, said legs having suitable form to guide said members into position against said wall, and in so doing to yield under pressure exerted by the pull of said clamping member exerted upon said shank.

2. The combination of a support having an opening therethrough and a cover plate for concealing said opening, said cover plate having an edge turned inwardly for snug engagement against said support, said cover plate being made of relatively soft material and provided with inwardly extending legs integral with it and projecting into said opening, said legs having outer inclined faces for binding against the marginal edge of the opening, said legs having suitable form to guide said cover plate into position against said support, and in so doing to yield under pressure of said plate, and clamping means engaging against the side of said support opposite said cover plate and connected with said cover plate.

3. In combination with a fixture provided with an aperture, a dished cover plate for concealing said aperture, said plate having a marginal annulus bearing against said support and encircling a portion of the surface of said support adjacent to said aperture, said plate being provided with a centrally disposed member extending through said aperture and integral with said plate, and a plurality of legs radially disposed about said member and spaced equidistant therefrom, said legs being provided with outer surfaces tapering inwardly, and a clamping member engaging said centrally disposed member for forcing said cover plate against said support.

4. In combination with a bath fixture having an aperture, a dished cover therefor, said cover having a marginal annulus bearing at one end of said aperture against said fixture, a centrally positioned outwardly extending shank interiorly integral with said cover and normally protruding from said aperture, a plurality of legs radially formed upon the interior of said cover and spaced equidistant from said shank, said shank being screw threaded, the outer surfaces of said legs tapering inwardly, and a washer nut working on the screw thread of said shank, the free ends of one or more of said tapered legs abutting the inclosing walls of said aperture, said washer nut adapted to engage said fixture at the opposite end of said aperture, whereupon said annulus and the terminal portion of each abutting leg will be held in rigid contact with the meeting walls of said apertured fixture.

In testimony whereof we have hereunto set our hands in presence of two subscribing witnesses.

PHILIP MUELLER.
HENRY MUELLER.

Witnesses:
W. R. GUSTIN,
W. R. BIDDLE.